United States Patent
Sasaki

(12) 
(10) Patent No.: US 6,657,671 B1
(45) Date of Patent: Dec. 2, 2003

(54) IMAGE INPUT DEVICE AND METHOD WITH STROBO-LIGHT CONTROL

(75) Inventor: Saburo Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/084,740

(22) Filed: May 27, 1998

(30) Foreign Application Priority Data

May 27, 1997 (JP) .............................................. 9-137288
May 14, 1998 (JP) ........................................... 10-131921

(51) Int. Cl.[7] .......................... H04N 5/238; H04N 3/14; H04N 5/235; H04N 5/222
(52) U.S. Cl. ....................... 348/367; 348/297; 348/362; 348/363; 348/371
(58) Field of Search ....................... 348/208.99, 207.99, 348/220.1, 222.1, 230.1, 296, 297, 362, 363, 371, 367; 396/159, 161, 167

(56) References Cited

U.S. PATENT DOCUMENTS

| | | | | |
|---|---|---|---|---|
| 4,449,802 A | * | 5/1984 | Nakamura | 396/159 |
| 5,416,517 A | * | 5/1995 | Tani et al. | 348/363 |
| 5,471,242 A | * | 11/1995 | Kondo | 348/362 |
| 5,517,243 A | * | 5/1996 | Kudo et al. | 348/363 |
| 5,808,681 A | * | 9/1998 | Kitajima | 348/371 |
| 5,847,836 A | * | 12/1998 | Suzuki | 348/371 |
| 5,889,553 A | * | 3/1999 | Kino et al. | 348/208.99 |
| 6,278,490 B1 | * | 8/2001 | Fukuda et al. | 348/371 |

* cited by examiner

*Primary Examiner*—Ngoc-Yen Vu
*Assistant Examiner*—Luong Nguyen
(74) *Attorney, Agent, or Firm*—Oblon, Spivak, McClelland, Maier & Neustadt, P.C.

(57) ABSTRACT

An image input device, in which a system controller controls, when successive operations for picking up images are to be executed, a second operation for picking up an image at the timing when image data obtained in a first operation for picking up an image is read out from an image pickup device, and controls, after the second operation for picking up an image, a light-shuttering operation at the timing earlier than the timing when the image data obtained in the second operation for picking up an image is read out from the image pickup device, shutters the light to the image pickup device with the optical mechanism, and controls an operation for strobo-light emission in a strobo circuit so that a time interval from starting of the second operation for picking up an image until the timing for emitting second strobo-light is shorter than a time interval from starting of the first operation for picking up an image until the timing for emitting first strobo-light.

24 Claims, 11 Drawing Sheets

IMAGE INPUT DEVICE AND METHOD WITH STROBO-LIGHT CONTROL

FIELD OF THE INVENTION

The present invention relates to an image input device and an image input method, and more particularly to an image input device and an image input method such as a digital still camera and a digital video camera receiving image data obtained by picking up images of an object using a solid image pickup device such as a CCD (Charge Coupled Device) image pickup device.

BACKGROUND OF THE INVENTION

In this type of image input device as described above, for executing successive operations for picking up images, it is necessary to read out image data and to store the read out data on a memory for each exposure, so that the time required to read out the data is different according to the number of pixels given to a solid image pickup device. Especially, as a large number of pixels are set in a solid image pickup device when a high quality image is to be obtained, a long time is required for reading out the data. For this reason, in recent years, there has been proposed the pixel shift technique for achieving a higher quality image with a smaller number of Description is made herein for a conventional method of making a high quality image. FIG. 11 is a timing chart for explaining a timing for pixel shift in an example based on the conventional technology. At the timing for executing pixel shift shown in FIG. 11, a time for reading (TR) required for reading out image data from a CCD image pickup device is set in a range, for instance, from 1/60 to 1/15 seconds, so that a time interval for releasing an electric shutter under the condition in which an exposure time in the first operation and in the second operation is set to a constant period of time, namely a time interval between timings each when an operation for reading out image data is started is obtained by adding a time for pixel shift (TS) to a time for reading (TR). The time for pixel shift (TS) is effected after the time for transferring charges (TF) from photodiodes to vertical CCD.

As described above, however, in the image input device and image input system according to the example based on the conventional technology, the electronic shutter can be released to execute operations for picking up images only at a time interval between the timings when the operation for reading out image data is started, which makes the device inappropriate for picking up an image of a dynamic object which requires high speed successive operations for picking up images thereof and for picking up images of an object by a camera held in user's hands because these operations must be executed in consideration for jiggle of the camera, and for this reason, pickup of images with the conventional device is limited to operations for picking up a still image of a static object, which does not allow full use of the picking-up capability.

Also, when successive operations for picking up images of an object is to be carried out, and if the object is not bright enough to be photographed, fuzzy images may be obtained due to occurrence of jiggle of the camera.

SUMMARY OF THE INVENTION

It is an object of the present invention to provide an image input device and an image input method which can obtain high quality and high resolution images even when an object is not bright enough to be photographed at the time of successive operations for picking up images thereof.

With the image input device and the image input method according to the present invention, when successive operations for picking up images is to be executed, the second operation for picking up an image is controlled at the timing when image data obtained in the first operation for picking up an image is read out from the image pickup device, and after the second operation for picking up the image, the light-shuttering operation is controlled at the timing earlier than the timing when the image data obtained in the second operation for picking up the image is read out from the image pickup device, and then the light to the image pickup device is shuttered, and in addition the operation for emitting strobo-light is controlled so that the time interval from starting of the second operation for picking up an image until emission of second strobo-light is made shorter than the time interval from starting of the first operation for picking up an image until emission of first strobo-light, so that the control for the second operation for picking up an image is not restricted by the timing when image data is read out from the image pickup device, but is immediately executed at the timing when the image data obtained in the first operation for picking up an image is read out, and also the time interval between strobo-light emission in the first operation for picking up an image and strobo-light emission in the second operation for picking up an image is reduced.

Other objects and features of this invention will become understood from the following description with reference to the accompanying drawings.

DESCRIPTION OF THE PREFERRED EMBODIMENT

The preferred embodiment of an image input device and an image input method according to the present invention with reference to the attached drawings.

Figure 1:
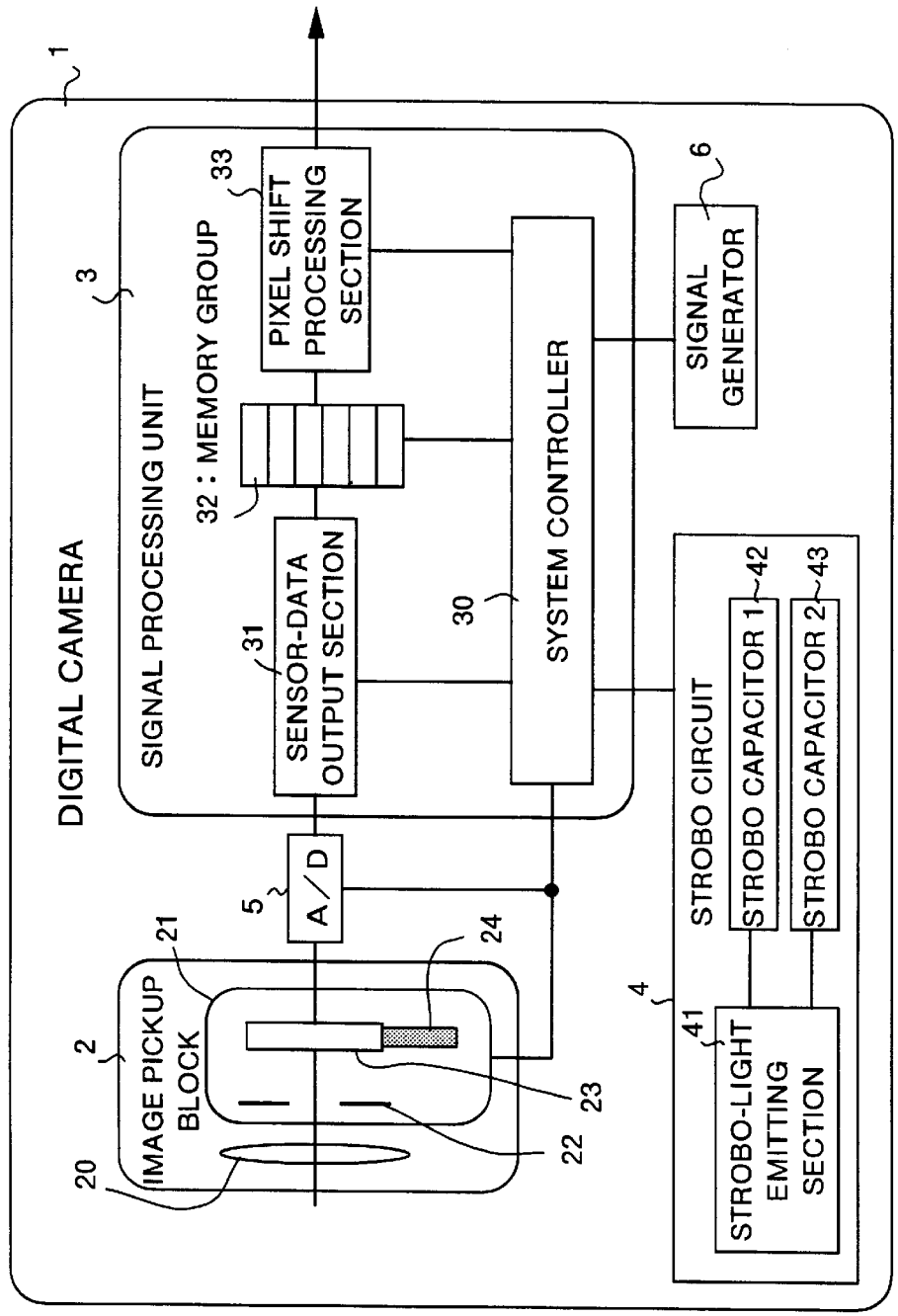
FIG. 1 is a block diagram showing one embodiment of an image input device according to the present invention.

FIG. 1 is a block diagram showing one embodiment of the image input device according to the present invention, and in the figure, the reference numeral 1 indicates a digital still camera (described as a digital camera hereinafter) which is one of examples of the image input device. The digital camera 1 shown in FIG. 1 comprises, by roughly classifying the main configuration thereof, an image pickup block 2 for executing an operation for picking up an image of an object to obtain analog image data, and a signal processing block 3 for processing digital image data having digitalized the analog image data obtained in the image pickup block 2 and outputting the processed data to an external device.

Provided in this digital camera 1 is an A/D converting section 5 for converting image data from analog to digital in a space between the image pickup block 2 and the signal processing block 3, and a signal generator 6 for generating a signal according to an operation of a mode switch or the like which is not shown in the figure and outputting the signal to the signal processing block 3 is connected to the signal processing block 3.

The image pickup block 2 comprises an optical lens 20 and an image pickup section 21 provided movably according to controls by the signal processing block 3. The image pickup section 21 comprises a shutter mechanism 22 for shuttering an incident light into the lens 20 with the optical mechanism, a CCD 23 receiving the light having entered the lens 20, and a piezoelectric element 24 supporting the CCD 23 for executing pixel shift by moving the light-receiving surface of the CCD 23 in parallel to a surface on which an image is formed and changing the pickup range of the identical object. The output of the CCD 23 is supplied to the A/D converting section 5.

The signal processing block 3 comprises components such as a system controller 30, a sensor-data output section 31, a memory group 32 comprising a plurality of memories, and a pixel shift processing section 33. The system controller 30 is connected to each of units such as the image pickup section 21 in the image pickup block 2, a strobo circuit 4, the A/D converting section 5, sensor-data output section 31, memory group 32, pixel shift processing section 33, and signal generator 6, and controls operations for picking up images, strobo-light emission, A/D conversion, read/write for the memory, pixel shift, and other operations according to key-entry or the like.

Figure 9:
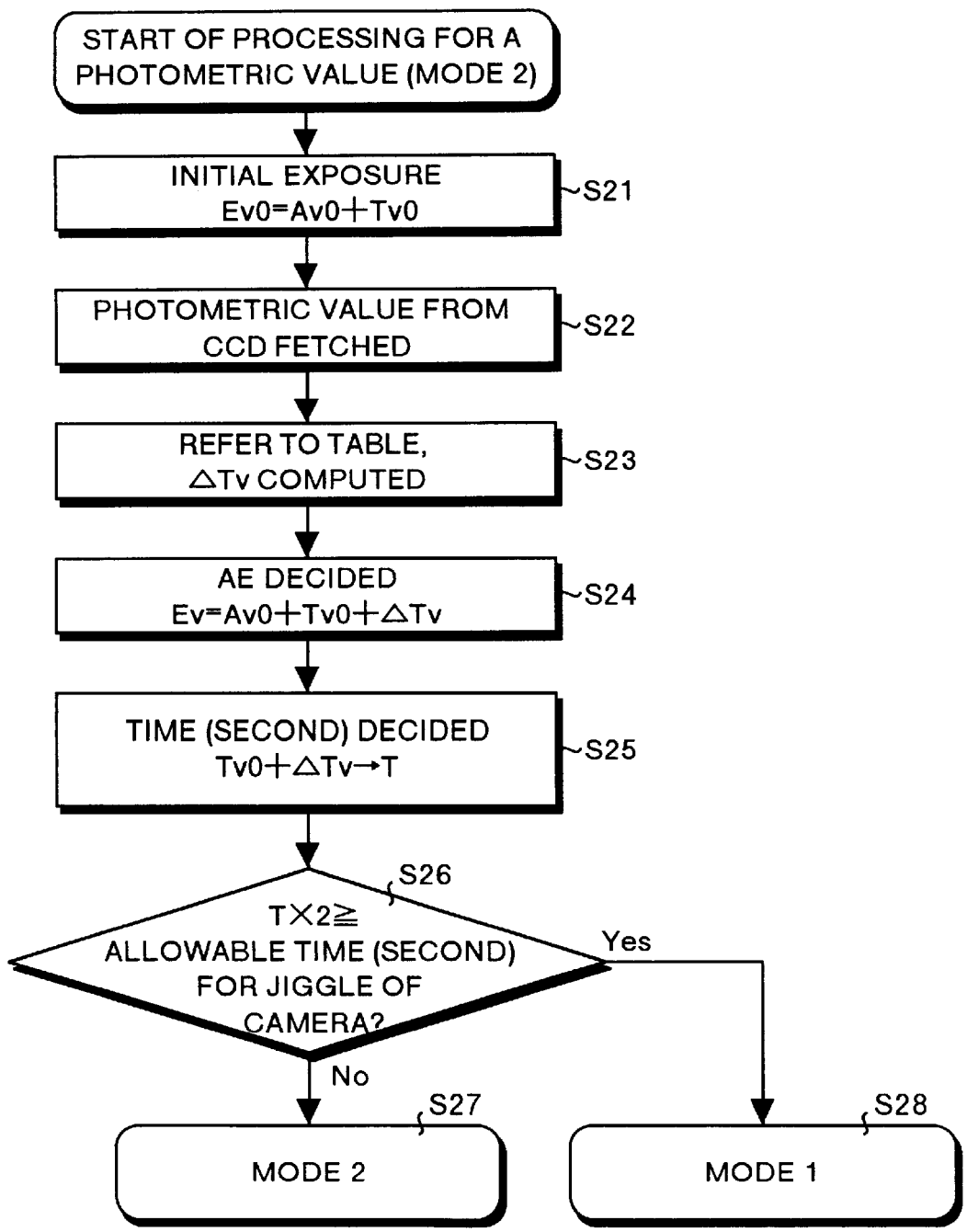
FIG. 9 is a flow chart for explaining the processing for a photometric value according to the embodiment.

The system controller 30 comprises a microcomputer, and executes processing for controlling each of the units and computation by actuating the microcomputer according to various programs (e.g., a program for making a computer execute processing according to the flow chart shown in FIG., 8 and FIG. 9) previously stored in a ROM.

The sensor-data output section 31 connected to the output terminal of the A/D converting section 5 receives digital image data and outputs received digital image data to any of the memories in the memory group 32 in the downstream section of the system according to the control provided by the system controller 30. The memory group 32 has a plurality of memories, uses one memory for each operation for picking up an image of an object as storage of image data according to the control provided by the system controller 30, reads out digital image data from one of the memories, and Supplies the read-out data to the pixel shift processing section 33 provided in the downstream section of the system.

The pixel shift processing section 33 executes the pixel shift processing according to the digital image data supplied from the memory group 32, and more specifically, obtains high quality images from an identical object according to a pixel shift rate (for instance, ½ pitch in a pixel) when the pickup range is changed by the piezoelectric element 24, and finally obtains image data for one sheet. The output terminal of this pixel shift processing section 33 is connected to an external terminal which is not shown in the figure to be connected to external equipment such as a personal computer, thereby data can be sent out.

The strobo circuit 4 is a circuit for emitting strobo-light according to the control provided by the system controller 30, and comprises a strobo-light emitting section 41, a strobo capacitor 42, and a strobo capacitor 43. The reason that the strobo circuit has two capacitors: the strobo capacitor 42 and strobo capacitor 43, is to respond to successive strobo-light emission.

Figure 2:
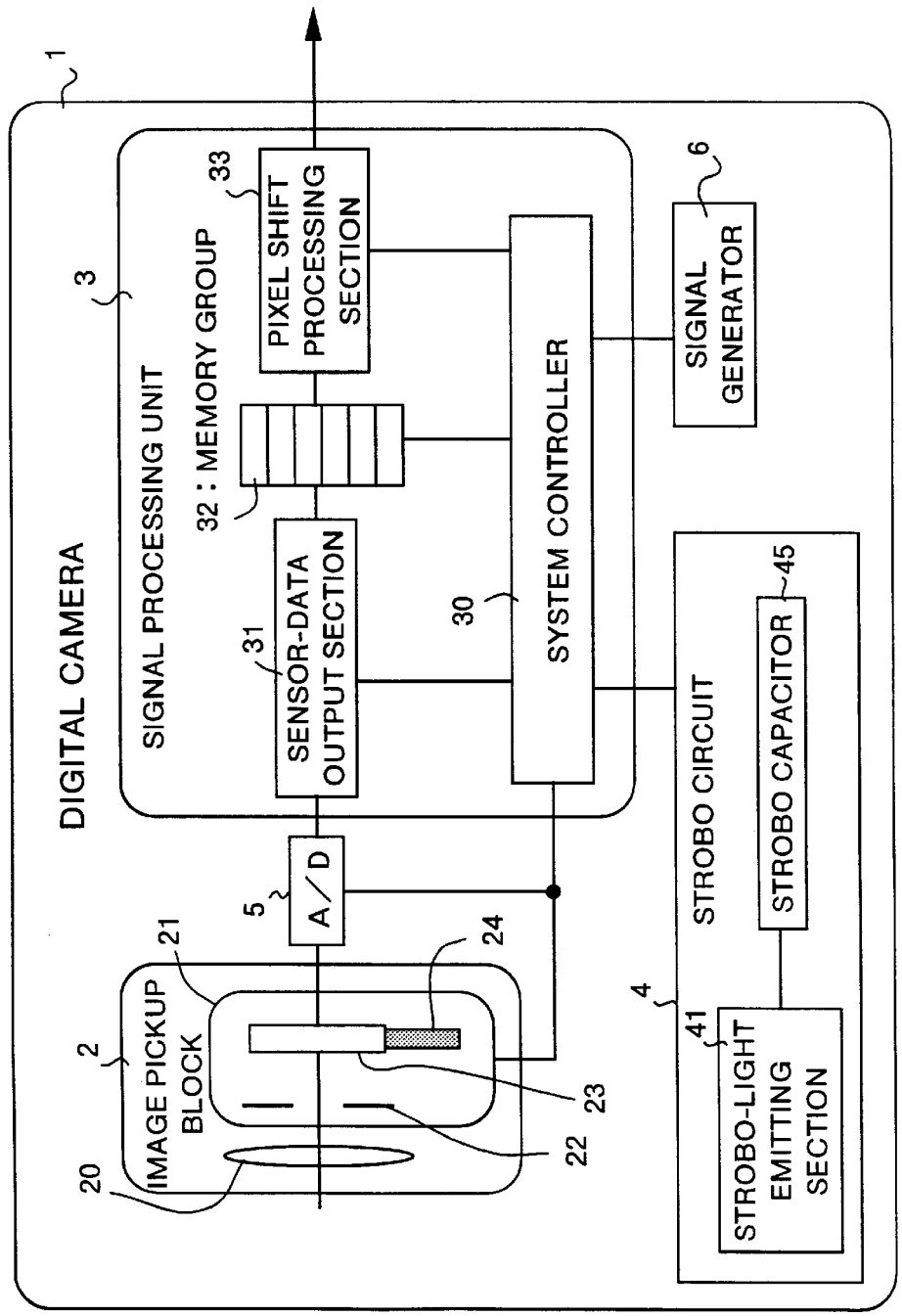
FIG. 2 is a block diagram showing another embodiment of the image input device according to the present invention.

FIG. 2 shows a view of the strobo circuit 4 with a single strobo capacitor 45 in place of the strobo capacitors 42 and 43 in the strobo circuit 4 shown in FIG. 1. When power is supplied to the strobo-light emitting section 41 by the single strobo capacitor 45 as described above, a capacity of the capacitor can easily be controlled because of single strobo capacitor 45, 50 that a light emitting rate of successive strobo-light emission can be uniformed. As a result, non-uniform quality in picked-up images due to nonuniformity in the light emitting rate of strobo-light emission can be suppressed. The other sections of the configuration in FIG. 2 are the same as those in FIG. 1, and description thereof is omitted herein.

The signal generator 6 has switches with which an operation for picking up an image is executed by actuating an electronic shutter or an shutter mechanism 22 and mode switches or the like for setting various modes. For example, N types of mode from Mode 1 to Node N (N: an integer of 3 or more) are provided for the mode switches.

Mode 1 is a mode used for executing high speed and successive operations for picking up images, pixel shift, and for processing of strobo-light emission (Refer to FIG. 7 described later), Mode 2 is a mode used for executing successive operations for picking up images as well as for the pixel shift processing (Refer to FIG. 6 described later), and Mode 3 is a mode used for executing an ordinary operation for picking up an image (Refer to FIG. 5 described later) in which an operation for picking up an image is executed only once at an ordinary speed.

Figure 3:
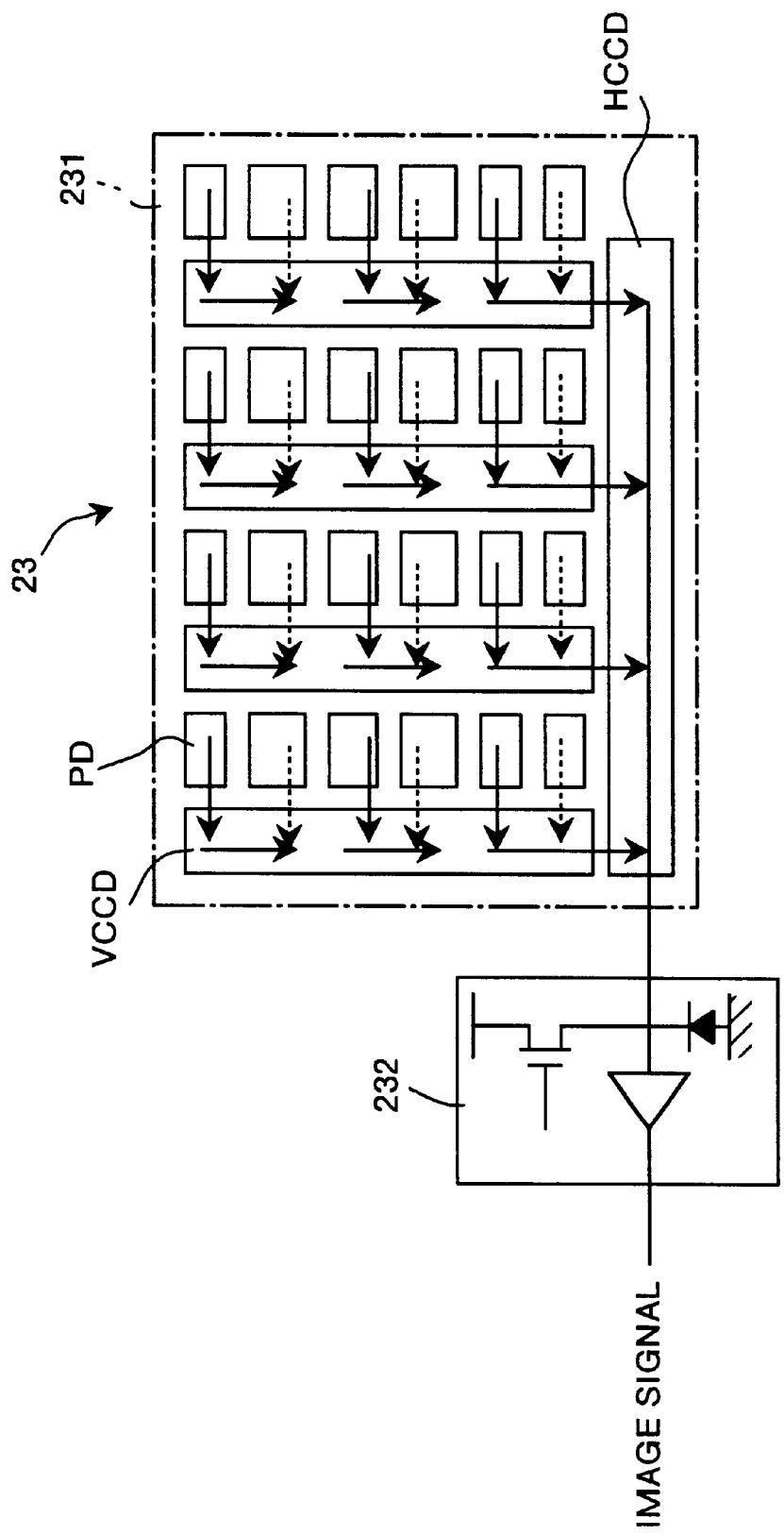
FIG. 3 is a circuit diagram showing an example of configuration of the image pickup device according to the embodiment.

Next description is made for the image pickup device 23. FIG. 3 is a block diagram showing an example of configuration of the image pickup device 23 in the image pickup block 2. The image pickup device 23 has a CCD section 231 and a signal detecting section 232. The CCD section 231 comprises a plurality of photodiodes PD placed in a matrix, a plurality of VCCDs for transferring charges on the photodiodes PD in the vertical direction, and a HCCD for transferring charges on the photodiodes PD in the horizontal direction.

The plurality of photodiodes PD receive incident light into the optical lens 20 and subject the light to photoelectric transfer to transfer charges to the VCCDs and then to the HCCD. The HCCD outputs the charges transferred from the VCCDs to the signal detecting section 232. The signal detecting section 232 converts the received charges to a voltage and outputs the voltage to the A/D converting section 5 as an image signal (analog image signal). It should be noted that in this embodiment, an all-pixels read-out type of image pickup device 23 is employed.

Figure 4:
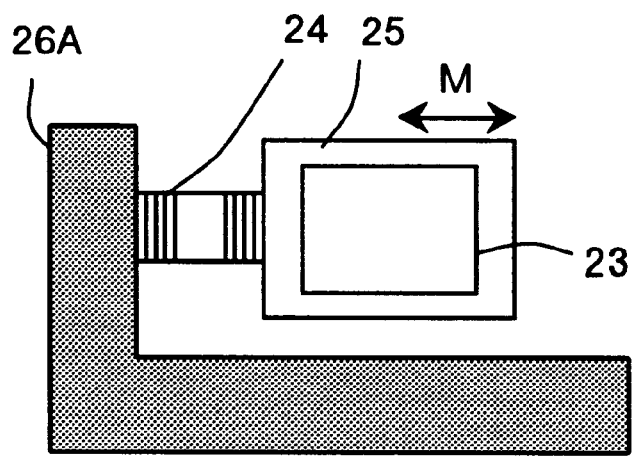
FIG. 4 is a general block diagram showing how a piezo-electric element is attached to other components according to the embodiment.

Next description is made for the piezoelectric element 24. FIG. 4 is a general block diagram showing how the piezoelectric element 24 in the image pickup block 2 is attached to other components. The layered type of piezoelectric element 24 has one edge thereof connected to a board 26A and supports an element holder 25 to which the image pickup device 23 is attached with the other edge thereof. The element holder 25 moves in the M direction indicated by the arrows according to actuation of the piezoelectric element 24. This piezoelectric element 24 executes the operation for changing a pickup range in any of the horizontal, vertical and diagonal directions according to an angle of attachment thereof in the image pickup block 2 (an operation for pixel shift in the piezoelectric element 24).

Figure 5:
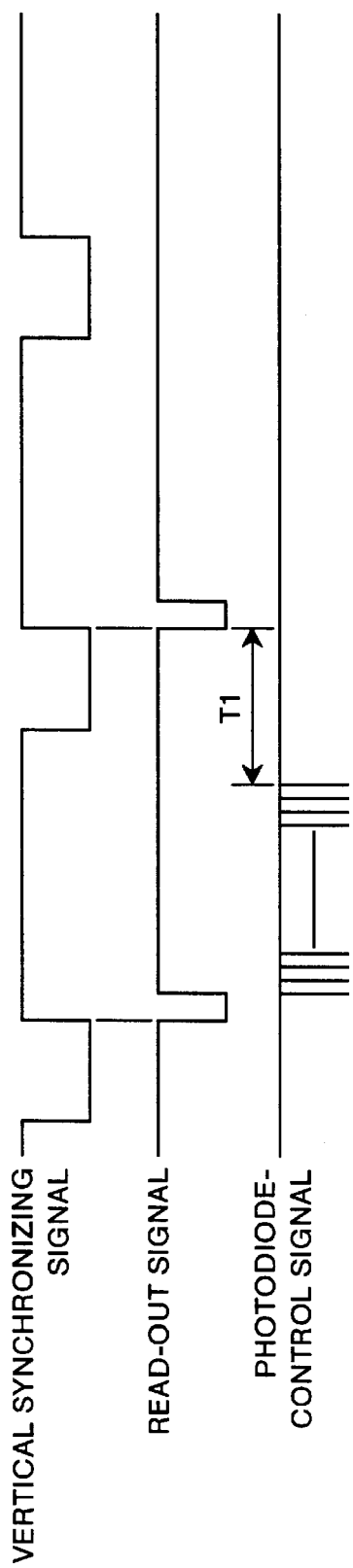
FIG. 5 is a timing chart showing a timing for reading out pixels (Mode 3) in an all-pixels read-out type of image pickup device according to the embodiment.

Next description is made for operations in Mode 1 to Mode 3. Mode 3 is first described. FIG. 5 is a timing chart showing a timing for reading out pixels with the all-pixels read-out type of image pickup device, and in the figure, the reference character T1 indicates an exposure time when the electronic shutter is released.

Mode 3 shown in FIG. 5 is a mode in which only the electronic shutter is used but the shutter mechanism 22 is not used. This Mode 3 is appropriate for picking up an image of an ordinary static object because a preset time interval is employed for successively picking up images since a read-out signal for reading out all pixels is generated in synchronism to a vertical synchronizing signal for reading out all pixels. A photodiode-control signal is generated, after the read-out signal is outputted, to remove charges accumulated in the photodiodes PD (sections, in FIG. 5, in which a plurality of vertical lines are shown on the photodiode-control signal) The electronic shutter is actuated for exposure during the time (exposure time Ti) after the charges are removed from the photodiodes PD by this photodiode-control signal until the next readout signal is generated.

Figure 6:
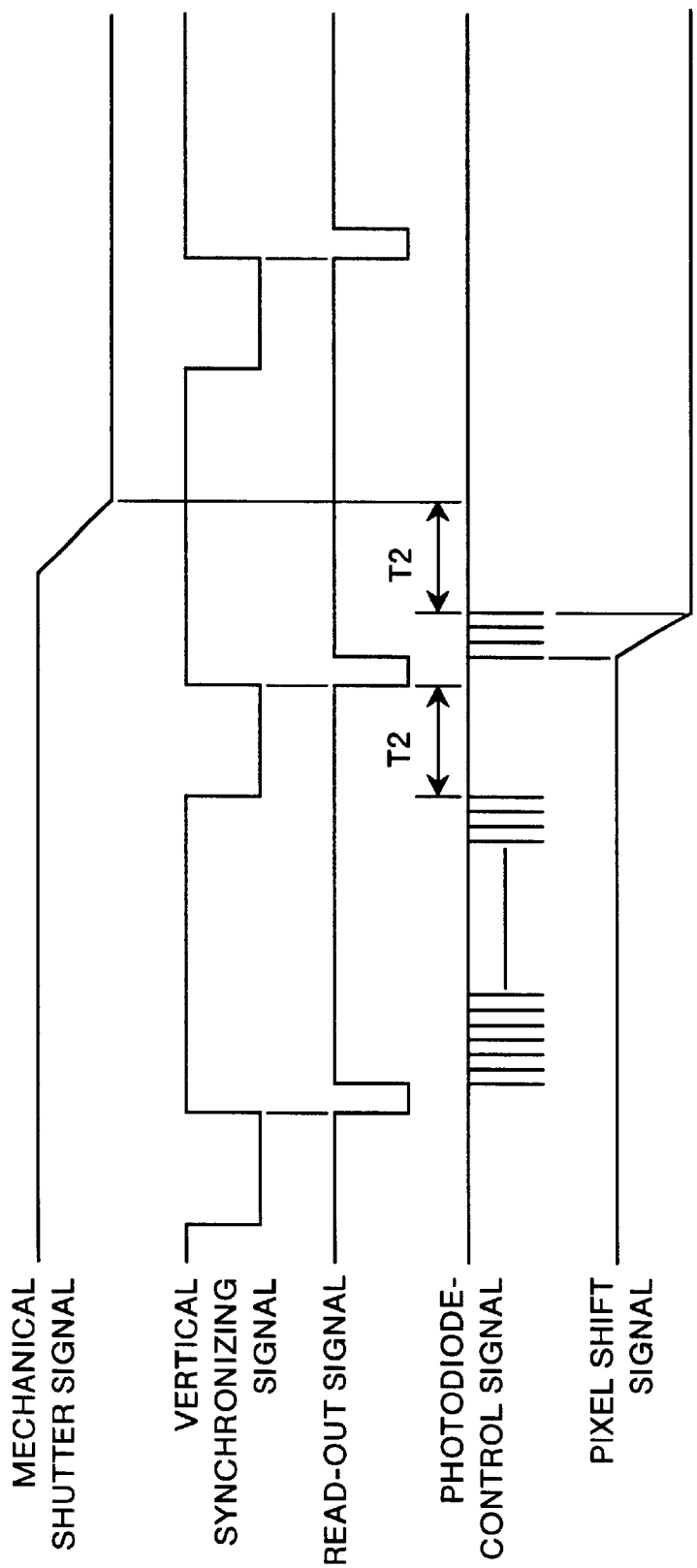
FIG. 6 is a timing chart showing a timing for reading out pixels (Mode 2) according to successive operations for high speed image-pickup as well as to pixel shift in the all pixels read-out type of image pickup device according to the embodiment.

Next description is made for Mode 2. FIG. 6 is a timing chart showing a timing for reading out pixels according to high speed successive operations for picking up images as well as to pixel shift in the all-pixels read-out type of image pickup device, and in the figure, the reference character T2 indicates an exposure time when the electronic shutter is released. In FIG. 6, a mechanical shutter signal is a control signal for actuating the shutter mechanism 22, and a pixel shift signal is a control signal used for shifting a pixel, for example, by ½ pitches by actuating the piezoelectric element 24.

Also in this Mode 2, a read-out signal is generated in synchronism to a vertical synchronizing signal, but in this Mode 2, after the exposure for a first operation for picking up an image is finished with elapse of the exposure time T2, when a read-out signal is generated, the operation for transmitting image data is executed in the image pickup device 23. A pixel shift signal is generated at the timing for the image data transfer, and an operation for pixel shift in the image pickup device 23 is executed by the piezoelectric element 24. The operation of this pixel shift is completed after the image data transfer. Also, after this transfer, the image data is written on a memory for the first operation for picking up an image in the memory group 32 according to the control provided by the system controller 30.

Then, after the operation for pixel shift is completed, exposure for a second operation for picking up an image is started. In this step, successive operations for picking up images are executed at a time interval in a range, for instance, from 12 to 32 msec. Also in this second operation for picking up an image, the exposure time is indicated by the reference character T2, and the same exposure rate for the same exposure time as that in the first operation can be acquired. A mechanical shutter signal is generated at the timing when the exposure time T2 has passed, and the shutter mechanism 22 is actuated. The light to the image pickup device 23 is shuttered with the optical mechanism in this shutter mechanism 22. The image data obtained in the second operation for picking up an image is transmitted when the next readout signal is generated like in the case of the first operation for picking up an image, and then control is provided so as to write the image data on a memory different from the memory on which the data obtained in the first operation for picking up an image has been written.

Figure 7:
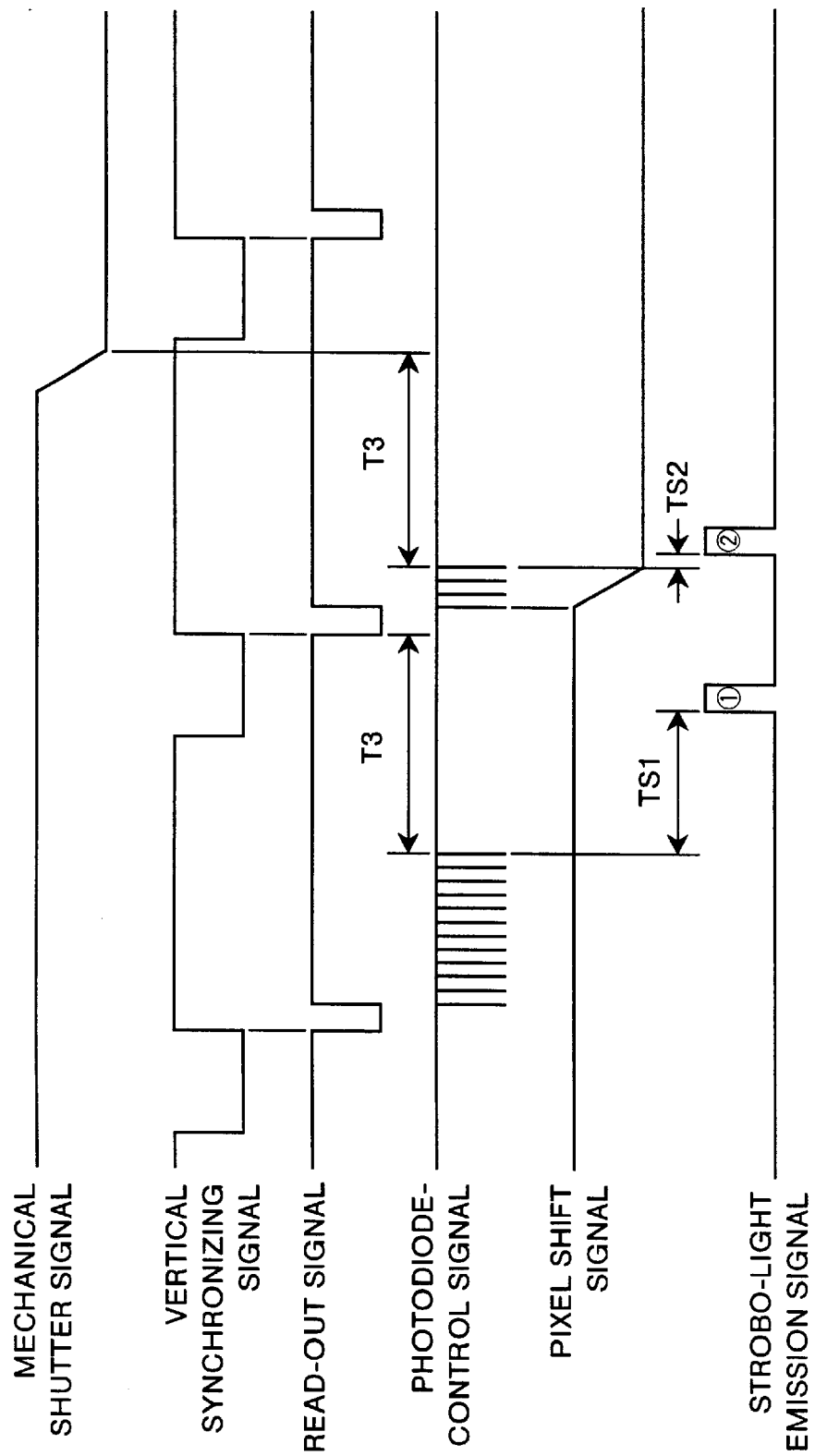
FIG. 7 is a timing chart showing a timing for reading out pixels (Mode 1) according to successive operations for high speed image-pickup, pixel shift, and to strobo-light emission in the all-pixels read-out type of image pickup device according to the embodiment.

Next description is made for Mode 1. FIG. 7 is a timing chart showing a timing for reading out pixels according to high speed successive operations for picking up images, pixel shift, and to strobo-light emission in the all-pixels read-out type of image pickup device, and in the figure, the reference character T3 indicates an exposure time when the electronic shutter is released.

In FIG. 7, a mechanical shutter signal is a control signal for actuating the shutter mechanism 22, a pixel shift signal is a control signal used for shifting a pixel, for example, by ½ pitches by actuating the piezoelectric element 24, and a strobo-light emission signal is a control signal for actuating the strobo circuit 4.

Also in this Mode 1, a readout signal is generated in synchronism to a vertical synchronizing signal, but in this Mode 1, after elapse of the exposure time TS1 since the exposure for a first operation for picking up an image has been started, when a first strobo-light emission signal (1) is generated, a first strobo-light is emitted in the strobo circuit 4. Then, after the exposure for the first operation for picking up an image is finished with elapse of the exposure time T3, when a read-out signal is generated, the operation for transmitting image data is executed in the image pickup device 23. A pixel shift signal is generated at the timing for the image data transfer, and an operation for pixel shift in the image pickup device 23 is executed by the piezoelectric element 24. The operation of this pixel shift is completed after the image data transfer. Also, after this transfer, the image data is written on a memory for the first operation for picking up an image in the memory group 32 according to the control provided by the system controller 30.

Then, after the operation for pixel shift is completed, exposure for a second operation for picking up an image is started. In this step, successive operations for picking up images are executed at a time interval in a range, for instance, from 12 to 32 msec. Also in this second operation for picking up an image, the exposure time is indicated by the reference character T3, and the same exposure rate for the same exposure time as that in the first operation can be acquired. After elapse of the exposure time TS2 (TS2$\leq$TS1) since the exposure for the second operation for picking up an image has been started, when a second strobo-light emission signal (2) is generated, the second operation for strobo-light emission is executed in the strobo circuit 4. The mechanical shutter signal is generated at the timing when the exposure time T3 has passed, and the shutter mechanism 22 is actuated. The light to the image pickup device 23 is shuttered with the optical mechanism in this shutter mechanism 22.

The image data obtained in the second operation for picking up an image is transmitted when the next read-out signal is generated like in the case of the first operation for picking up an image, and then control is provided so as to write the image data on a memory different from the memory on which the data obtained in the first operation for picking up an image has been written.

With the Mode 1, timing for emitting the first strobo-light is set so that the timing is shifted to the side of the first exposure completion time as closer as possible to emit the strobo-light, while the timing for emitting the second strobo-light is set so that the emission is executed at the side of the second exposure starting time as closer as possible. In other words, the time interval from starting of the second operation for picking up an image until the timing for emitting second strobo-light is controlled to be shorter than the time interval from starting of the first operation for picking up an image until the timing for emitting first strobo-light (TS1≧TS2), and then the operation for strobo-light emission is executed. With this feature, a time interval for exposure with the strobo is made shorter, and for this reason successive images which are not fuzzy can be acquired. However, when successive operations for picking up images is executed in a bright place where an exposure time by an electronic shutter is the same as an emission time of a strobo-light, the timings each for light emission is the same. It should be noted that the second strobo-light emission may be executed concurrently when the second exposure is started.

Figure 8:
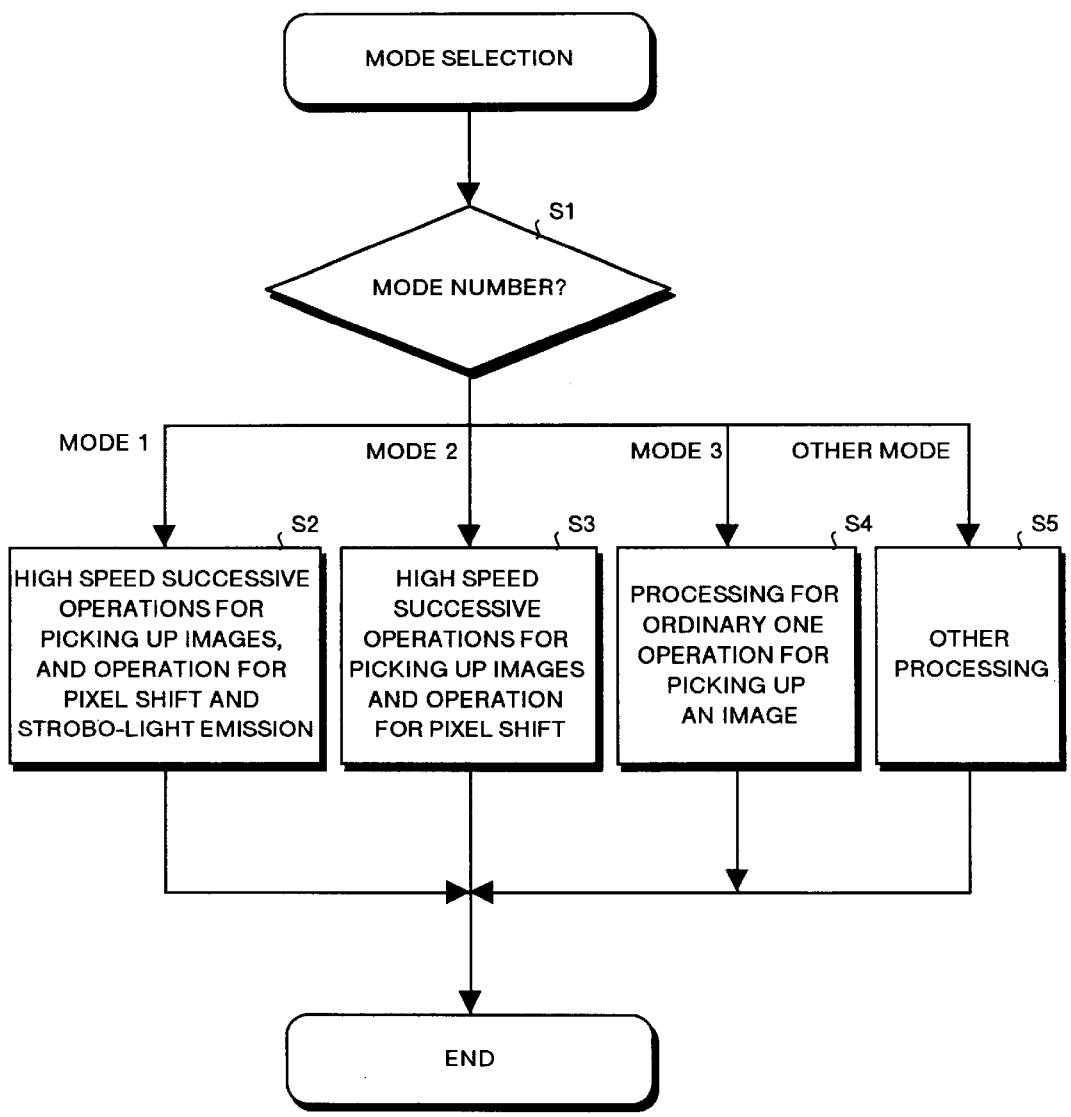
FIG. 8 is a flow chart for explaining the processing for mode selection according to the embodiment.

Next description is made for operations of the system controller 30. At first, description is made for selection of a mode. FIG. 8 is a flow chart for explaining the processing for mode selection. In this processing for mode selection, an operation for determining a mode is executed according to an operation signal generated by the signal generator 6 in response to an operation of any of mode switches not shown in the figure. Namely, in the system controller 30, when the operation signal is received, a mode No. (number) is determined according to the operation signal (step S1)

If it is determined that the mode No. is "1" the processing shifts to step S2, and processing for high speed successive operations for picking up images, pixel shift, and for strobo-light emission according to Mode 1 is executed. If it is determined that the mode No. is "2", the processing shifts to step S3, and processing for high speed successive operations for picking up images as well as for pixel shift according to Mode 2 is executed. Also if it is determined that the mode No. is "3", the processing shifts to step S4, and processing for executing an ordinary operation for picking up an image once according to Mode 3. Then, if it is determined that the mode No. is other than "1" to "1", the processing shifts to step S5, and other processing for photographing in accordance to the mode No. is executed.

Figure 10:
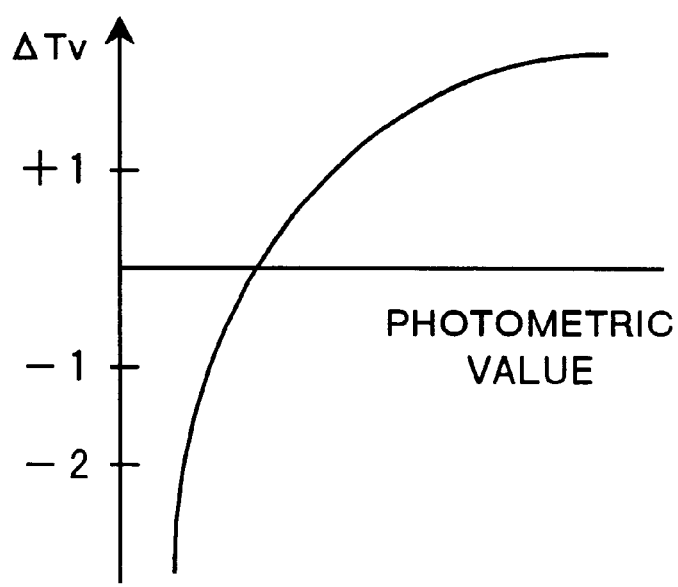
FIG. 10 is a view graphically showing a correlation between a photometric value and an exposure time correction value $\Delta Tv$ according to the embodiment.
Figure 11:
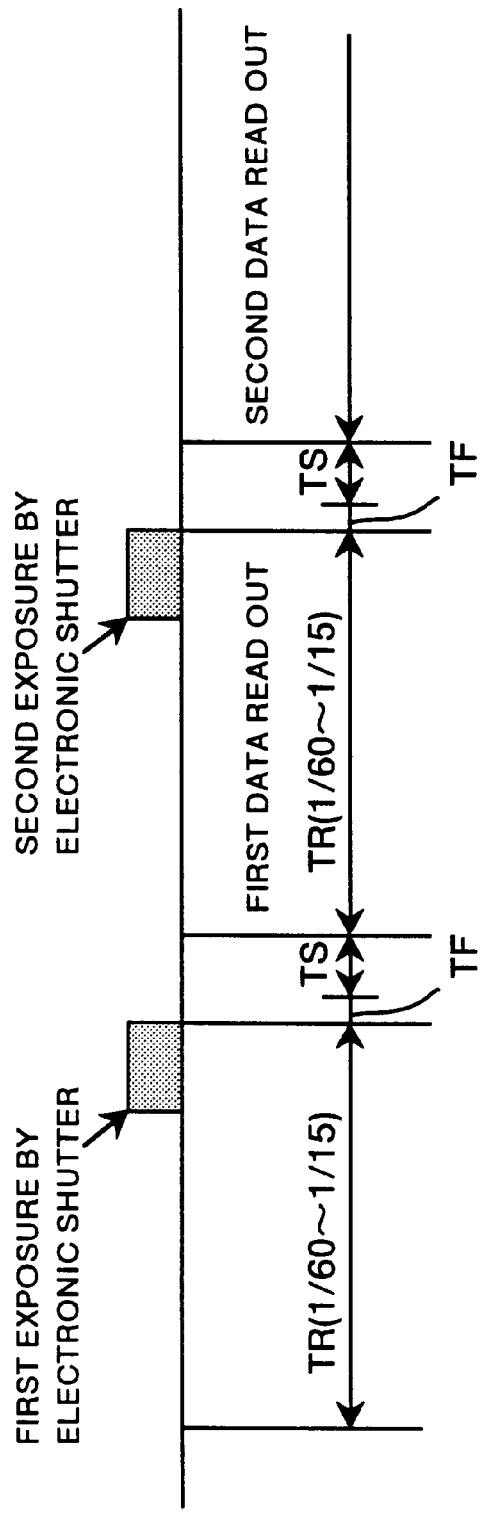
FIG. 11 is a timing chart for explaining a timing forpixel shift according to the example based on the conventional

Then, description is made for Node 2 (processing for high speed successive image-pickup as well as for pixel shift). FIG. 9 is a flow chart for explaining processing for a photometric value performed before Mode 2 is executed, and FIG. 10 is a view graphically showing a correlation between a photometric value and an exposure time correction value ΔTv. In this processing for a photometric value, at first, initial exposure (Ev0) is obtained by adding an aperture value (Δ0) to an exposure time value (Tv0) (step S21). A photometric value is fetched by the image pickup device 23 (step S22), and an exposure time correction value ΔTv is obtained based on the photometric value (step S23)

In this step S23, there is a method for obtaining the exposure time correction value ΔTv from the photometric value by referring to a table. The table is created by arranging curve data for the photometric value and exposure time correction value ΔTv shown in FIG. 10 so that the photometric value is correlated to the exposure time correction value ΔTv, and the created table may be stored in the system controller 30. In step S24, in order to decide AE (automatic exposure), exposure (Ev) is obtained by summing an aperture value (Δ0), an exposure time value (Tv0), and an exposure time correction value (ΔTv), and in step 25, a time (second) (T) required for one operation for picking up an image is obtained by adding the exposure time value (Tv0) to the exposure time correction value (ΔTv).

The time until occurrence of jiggle of a camera is previously registered in the system controller 30 as an allowable time (second) for jiggle of a camera. In step S26, if the time (second) (T) for one operation is doubled and the obtained value (T×2) is smaller than the time (second) for jiggle of a camera, the processing in Mode 2 (processing for high speed successive image-pickup as well as for pixel shift) is executed as set by the mode switch in step S27, and if it is determined that the value is larger than the preset value, the operation mode is switched to Mode 1 (processing for high speed successive image-pickup, pixel shift, and for strobo-light emission) in step S28, and the processing in Mode 1 is executed.

As described above, with the embodiment, when the processing for high speed successive image-pickup (Mode 1) is to be executed with emission of strobo-light, the second operation for picking up an image is controlled at the timing when the image data obtained in the first operation for picking up an image is read out from the image pickup device 23, and after the second operation for picking up an image, the light shuttering operation is controlled at the timing earlier than the timing when the image data obtained in the second operation for picking up an image is read out from the image pickup device 23, and the light to the image pickup device 23 is shuttered with the shutter mechanism 22, and also, the operation for strobo-light emission in the strobo circuit 4 is controlled with the shorter time interval (TS1≧TS2) from starting of the second operation for picking up an image until the timing for emitting the second strobo-light than the time interval from starting of the first operation for picking up an image until the timing for emitting the first strobo-light, so that the control of the second operation for picking up an image is immediately executed at the timing when the image data obtained in the first operation for picking up an image is read out without being restricted by the timing when image data is read out from the image pickup device 23, and the time interval between strobo-light emission in the first operation for picking up an image and that in the second operation for picking up an image becomes shorter.

As a result, time intervals between timings for operations for picking up images are reduced and successive operations for picking up images are executed at a higher speed, so that operations for picking up an image of a dynamic object and also picking up an image of an object by a camera held in user's hands can be performed without being restricted to a static object by image pickup conditions. Time intervals between strobo-light emission are also reduced, so that an object can successively be photographed with strobo even when it is not bright enough to be photographed, and not fuzzy images, namely high quality and high resolution images can be obtained.

Also, when the successive operations for picking up images (Mode 1 and Mode 2) are to be executed, the change of the pickup range is controlled after the first operation for picking up an image, a different pickup range can be employed between the first and second operations for picking up images, and with this feature, image data for a plurality sheets of image in different pickup ranges can be obtained by means of successive operations for picking up images, and for this reason, the invention is quite effective in a case where a high quality image is obtained by making use of shift in pixel pitch.

When the successive operations for picking up images (Mode 1 and Mode 2) are to be executed, the first image data obtained in the first operation for picking up an image and the second image data obtained in the second operation for picking up an image are designed to be synthesized to obtain image data for one sheet of image, so that image data for one sheet of image can be obtained on the device by synthesizing the first and second image data, which makes it possible to obtain a sheet of high quality image with image data for a plurality sheets of image obtained by means of successive operations for picking up images.

When the successive operations for picking up images (Mode 1 and Mode 2) are to be executed, the operation for changing the pickup range is controlled after the first operation for picking up an image, the first image data obtained in the first operation for picking up an image and the second image data obtained in the second operation for picking up an image are designed to be synthesized to obtain image data for one sheet of image, so that image data for one sheet of image can be obtained on the device by synthesizing the first and second image data each in a different pickup range, and with this feature, image data for a plurality sheets of image each in a different pickup range is obtained by means of successive operations for picking up images, which allows higher quality of an image to be achieved by making use of shift in pixel pitch.

The operation for pixel shift in the image pickup device 23 is executed by changing a pickup range of an object by means of actuating the piezoelectric element 24, 50 that the configuration can be simplified, which makes it possible to realize a high quality and high resolution image with the configuration which is compact and less expensive.

Further, the invention has Mode 1 used for executing successive operations for high speed image-pickup with emission of strobo-light and Mode 2 used for executing successive operations for picking up images without emission of strobo-light, and determination is made as to whether Mode 2 is to be executed or Mode 1 is to be executed according to a result of comparison between an exposure time obtained based on a photometric value by the image pickup device 23 and a preset allowable time in consideration for jiggle of a camera, so that Mode 2 is executed if it is determined that the operation for picking up an image can be executed within the time when jiggle of a camera may not occur at the time of picking up images, and if it is determined that the operation can not be executed within the time described above, Mode 1 can be selected, and with this feature, when successive operations for picking up images are to be executed, an optimal operation for picking up an image can be executed as required according to any situation at the time of picking up images, which makes it possible to obtain a high quality and high resolution image at any time (from a bright situation to a dark situation). Also, switching between a normal mode and a pixel shift mode is not required, so that switching to an optical low-pass filter is eliminated.

In the embodiment above, the movement direction (M) of the piezoelectric element 24 includes only one direction, but the direction is not limited to one direction described above, and a plurality of piezoelectric elements may be used so as to be capable of moving in any of vertical and horizontal directions. Also, in Mode 1 and Mode 2, the same exposure time is employed for the first and second operations for picking up images, but an exposure time is not limited to the above time, so that an exposure time in the second operation for picking up an image is set to be longer than that in the first operation for picking up an image.

As described above, by using a different exposure time between the first operation for picking up an image and the second operation for picking up an image, a plurality sheets of image each having a different exposure rate can be obtained by means of a plurality times of operation for picking up images of an identical object, and for this reason a high resolution and a widely dynamic range of high quality image can be acquired by synthesizing the plurality sheets of image.

Although description has been made for the all-pixels readout type of image pickup device 23 in the embodiment, but the image pickup device is not limited to the image pickup device described above, and all pixels may be read out by using a field read-out type of image pickup device.

As described above, with the invention, when successive operations for picking up images is to be executed, the second operation for picking up an image is controlled at the timing when image data obtained in the first operation for picking up an image is read out from the image pickup device, and after the second operation for picking up the image, the light-shuttering operation is controlled at the timing earlier than the timing when the image data obtained in the second operation for picking up the image is read out from the image pickup device, and then the light to the image pickup device is shuttered, and in addition the operation for emitting strobo-light is controlled so that the time interval from starting of the second operation for picking up an image until emission of second strobo-light is made shorter than the time interval from starting of the first operation for picking up an image until emission of first strobo-light, so that the control for the second operation for picking up an image is not restricted by the timing when image data is read out from the image pickup device but is immediately executed at the timing when the image data obtained in the first operation for picking up an image is read out, and also the time interval between strobo-light emission in the first operation for picking up an image and strobo-light emission in the second operation for picking up an image is reduced.

As a result, time intervals between timings for operations for picking up images are reduced and successive operations for picking up images are speeded up, so that operations for picking up images of a dynamic object and also picking up an image of an object by a camera held in user's hands can be performed without being restricted to a static object by image pickup conditions. Also, time intervals between strobo-light emission are reduced, so that an object can successively be photographed with strobo even when it is not bright enough to be photographed, and not fuzzy images, namely high quality and high resolution images can be obtained.

With the invention, when successive operations for picking up images are to be executed, the operation for changing the pickup range is controlled after the first operation for picking up an image, the second operation for picking up an image is controlled at the timing when the image data obtained in the first operation for picking up an image is read out from the image pickup device, and after the second operation for picking up an image, the light-shuttering operation is controlled at the timing earlier than the timing when the image data obtained in the second operation for picking up an image is read out from the image pickup device, and then the light to the image pickup device is shuttered, and in addition the operation for emitting strobo-light is controlled so that the time interval from starting of the second operation for picking up an image until emission of second strobo-light is made shorter than the time interval from starting of the first operation for picking up an image until emission of first strobo-light, so that the control for the second operation for picking up an image is not restricted by the timing when image data is read out from the image pickup device, but is immediately executed at the timing when the image data obtained in the first operation for picking up an image is read out, and in that case, a different pickup range can be employed between the first and second operations for picking up images, and also the time interval between strobo-light emission in the first operation for picking up an image and strobo-light emission in the second operation for picking up an image is reduced.

As a result, the time intervals between pickup timings are reduced and the successive operations for picking up images are speeded up, so that operations for picking up an image of a dynamic object and also picking up an image of an object by a camera held in user's hands can be performed without being restricted by the image pickup conditions, and image data for a plurality sheets of image each in a different pickup range can be obtained by successively picking up images of the identical object, and for this reason, the invention is quite effective in a case where a high quality image is obtained by making use of shift in pixel pitch. Also, time intervals between strobo-light emission are reduced, so that an object can successively be photographed with strobo even when it is not bright enough to be photographed, and not fuzzy images, namely high quality and high resolution images can be obtained.

With the invention, when successive operations for picking up images are to be executed, the second operation for picking up an image is controlled at the turning when the first image data obtained in the first operation for picking up an image is read out from the image pickup device, and after the second operation for picking up an image, the light-shuttering operation is controlled at the timing earlier than the timing when the second image data obtained in the second operation for picking up an image is read out from the image pickup device, and after the first and second image data are read out and stored at each timing when each of the data is read out respectively, the first and second image data are synthesized, and the operation for emitting strobo-light is controlled so that the time interval from starting of the second operation for picking up an image until emission of second strobo-light is made shorter than the time interval from starting of the first operation for picking up an image until emission of first strobo-light, so that the control for the second operation for picking up an image is not restricted by the timing when image data is read out from the image pickup device, but is immediately executed at the timing when the image data obtained in the first operation for picking up an image is read out, image data for one sheet of image can be obtained on the device by synthesizing the first and second image data, and also the time interval between strobo-light emission in the first operation for picking up an image and strobo-light emission in the second operation for picking up an image is reduced.

As a result the time intervals between pickup timings are reduced and the successive operations for picking up images are speeded up, so that operations for picking up an image of a dynamic object and also picking up an image of an object by a camera held in user's hands can be performed without being restricted by the image pickup conditions, and an image for one sheet is obtained from the synthesis of the plurality sheets of image obtained by successively picking up an image of the identical object, and for this reason high quality images can be acquired. Also, time intervals between strobo-light emission are reduced, so that an object can successively be photographed with strobo even when it is not bright enough to be photographed, and not fuzzy images, namely high quality and high resolution images can be obtained.

With the invention, when successive operations for picking up images are to be executed, the operation for changing the pickup range is controlled after the first operation for picking up an image, the second operation for picking up an image is controlled at the timing when the image data obtained in the first operation for picking up an image is read out from the image pickup device, and after the second operation for picking up an image, the light-shuttering operation is controlled at the timing earlier than the timing when the image data obtained in the second operation for picking up an image is read out from the image pickup device, and after the first and second image data are read out and stored at each timing when each of the data is read out respectively, the first and second image data are synthesized, and the operation for emitting strobo-light is controlled so that the time interval from starting of the second operation for picking up an image until emission of second strobo-light is made shorter than the time interval from starting of the first operation for picking up an image until emission of first strobo-light, so that the control for the second operation for picking up an image is not restricted by the timing when image data is read out from the image pickup device, but is immediately executed at the timing when the image data obtained in the first operation for picking up an image is read out, image data for one sheet of image can be obtained on the device by synthesizing the first and second image data each in a pickup range, and also the time interval between strobo-light emission in the first operation for picking up an image and strobo-light emission in the second operation for picking up an image is reduced.

As a result, the time intervals between pickup timings are reduced and the successive operations for picking up images are speeded up, so that operations for picking up an image of a dynamic object and also picking up an image of an object by a camera held in user's hands can be performed without being restricted by the image pickup conditions, and image data for a plurality sheets of image each in a different pickup range is obtained by successively picking up images of the identical object, and for this reason high quality images can be obtained by making use of shift in pixel pitch. Also, time intervals between strobo-light emission are reduced, so that an object can successively be photographed with strobo even when it is not bright enough to be photographed, and not fuzzy images, namely high quality and high resolution images can be obtained.

With the invention, the strobo-light emitting unit has a plurality of strobo capacitors, so that the light emission capacity sufficiently enough to be required for successive light emission can be insured.

With the invention, the strobo-light emitting unit has a single strobo capacitor, and a light emitting rate in successive strobo-light emission can easily be controlled, so that nonuniform quality in picked-up images can efficiently be suppressed.

With the invention, the second mode is executed if the operation for picking up an image can be executed within the time when jiggle of a camera may not occur at the time of photographing, and the first mode can be selected if the operation can not be executed within the time described above, and with this feature, when successive operations for picking up images are to be executed, an optimal operation for picking up an image can be executed as required according to any situation at the time of picking up images, which makes it possible to obtain a high quality and high resolution image at any time (from a bright situation to a dark situation) Also, switching between a normal mode and a pixel shift mode is not required, so that switching to an optical low-pass filter is eliminated.

This application is based on Japanese patent applications No. HEI 9-137288 and No. HEI 10-131921 filed in the Japanese Patent Office on May 27, 1997 and May 14, 1998, respectively, the entire contents of which are hereby incorporated by Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image input device for executing successive operations for picking up images comprising:
    an image pickup means for picking up an image of an object to obtain image data for the object for a certain number of pixels;
    alight-shuttering means for performing a light-shuttering operation to form a light-shuttered state relative to said image pickup means;
    a strobo-light emitting means for emitting strobo-light when an image of an object is picked up by said image pickup means;
    a first control means for controlling a second operation for picking up an image among successive operations for picking up images by said image pickup means at a timing when the image data obtained in a first operation for picking up an image among the successive operations for picking up images by said image pickup means is read out from said image pickup means, and also for controlling, after said second operation for picking up the image, the light shuttering operation by said light-shuttering means at a timing earlier than a timing when the image data obtained in said second operation for picking up the image is read out from said image pickup means; and
    a second control means for controlling an operation for emitting strobo-light by said strobo-light emitting means so that a time interval from starting of said second operation for picking up an image until second strobo-light is emitted is made shorter than a time interval from starting of said first operation for picking up an image until first strobo-light is emitted.

2. An image input device according to claim 1; wherein said strobo-light emitting means has a plurality of strobo capacitors.

3. An image input device according to claim 1; wherein said strobo-light emitting means has a single strobo capacitor.

4. An image input device according to claim 1; wherein said first control means has at least a first mode for executing successive operations for picking up images by emitting said strobo-light and a second mode for executing successive operations for picking up images without emitting of said strobo-light, and determines whether said first mode is to be executed or said second mode is to be executed according to a result of a comparison between an exposure time obtained based on a photometric value by said image pickup means and a preset allowable time in consideration of camera shaking.

5. An image input device for executing successive operations for picking up images comprising:
    an image pickup means for picking up an image of an object to obtain image data for a certain number of pixel is;
    a changing means for changing a pickup range for the object to be photographed by said image pickup means;
    a light shuttering means for performing a light-shuttering operation to form a light-shuttered state relative to said image pickup means;
    a strobo-light emitting means for emitting strobo-light when an image of an object is picked up by said image pickup means;
    a first control means for controlling an operation for changing said pickup range by said changing means after a first operation for picking up an image among successive operations for picking up images by said image pickup means, controlling a second operation for picking up an image among the successive operations for picking up images by said image pickup means at a timing when the image data obtained in the first operation for picking up the image is read out from said image pickup means, and also controlling, after said second operation for picking up the image, the light shuttering operation by said light-shuttering means at a timing earlier than a timing when the image data obtained in said second operation for picking up the image is read out from said image pickup means; and
    a second control means for controlling a strobo-light emitting operation by said strobo light emitting means so that a time interval from starting of said second operation for picking up an image until a second strobo-light is emitted is made shorter than a time interval from starting of said first operation for picking up an image until a first strobo-light is emitted.

6. An image input device according to claim 5; wherein said strobo light emitting means has a plurality of strobo.

7. An image input device according to claim 5; wherein said strobo light emitting means has a single strobo capacitor.

8. An image input device according to claim 5; wherein said first control means has at least a first mode for executing successive operations for picking up images by emitting said strobo-light and a Second mode for executing successive operations for picking up images without emitting of said strobo-light, and determines whether said first mode is to be executed or said second mode is to be executed according to a result of a comparison between an exposure time obtained based on a photometric value by said image pickup means and a preset allowable time in consideration of camera shaking.

9. An image input device for executing successive operations for picking up images comprising:
    an image pickup means for picking up an image of an object to obtain image data for a certain number of pixels
    a storing means for storing therein image data read out from said image pickup means;
    a light-shuttering means for performing a light-shuttering operation to form a light-shuttered state relative to said image pickup means;

a strobo-light emitting means for emitting strobo light when an image of an object is picked up by said image pickup means;

a first control means for controlling a second operation for picking up an image among successive operations for picking up images by said image pickup means at a timing when first image data obtained in a first operation for picking up an image among the successive operations for picking up images by said image pickup means is read out from said image pickup means, and also controlling, after said second operation for picking up the image, the light shuttering operation by said light-shuttering means at a timing earlier than a timing when second image data obtained in said second operation for picking up the image is read out from said image pickup means;

a second control means for controlling a strobo light emitting operation by said strobo-light emitting means so that a time interval from starting of said second operation for picking up an image until a second strobo-light is emitted is made shorter than a time interval from starting of said first operation for picking up an image until a first strobo light is emitted; and an image synthesizing means for synthesizing the first and second image data read out from said image pickup means and stored in said storing means under control by said first control means.

10. An image input device according to claim 9, wherein said strobo light emitting means has a plurality of strobo capacitors.

11. An image input device according to claim 9, wherein said strobo-light emitting means has a single strobo capacitor.

12. An image input device according to claim 9; wherein said first control means has at least a first mode for executing successive operations for picking up images by emitting said strobo-light and a second mode for executing successive operations for picking up images without emitting of said strobo-light, and determines whether said first mode is to be executed or said second mode is to be executed according to a result of a comparison between an exposure time obtained based on a photometric value by said image pickup means and a preset allowable time in consideration of camera shaking.

13. An image input device for executing successive operations for picking up images comprising:

an image pickup means for picking up an image of an object to obtain image data for a certain number of pixels;

a changing means for changing a pickup range of an object to be photographed by said image pickup means;

a storing means for storing therein image data read out from said image pickup means;

a light-shuttering means for performing a light-shuttering operation to form a light-shuttered state relative to said image pickup means;

a strobo-light emitting means for emitting strobo-light when an image of an object is picked up by said image pickup means;

a first control means for controlling an operation for changing a pickup range by said changing means after a first operation for picking up an image among successive operations for picking up images by said image pickup means, controlling a second operation for picking up an image among the successive operations for picking up images by said image pickup means at a timing when the first image data obtained in the first operation for picking up the image is read out from said image pickup means, and also controlling, after said second operation for picking up the image, the light-shuttering operation by said light-shuttering means at a timing earlier than a timing when the second image data obtained in said second operation for picking up the image is read out from said image pickup means;

a second control means for controlling a strobo light emitting operation by said strobo-light emitting means so that a time interval from starting of said second operation for picking up an image until a second strobo-light is emitted is made shorter than a time interval from starting of said first operation for picking up an image until a first strobo-light is emitted; and an image synthesizing means for synthesizing the first and second image data read out from said image pickup means and stored in said storing means under control by said first control means.

14. An image input device according to claim 13; wherein said strobo light emitting means has a plurality of strobo capacitors.

15. An image input device according to claim 13; wherein said strobo-light emitting means has a single strobo capacitor.

16. An image input device according to claim 13; wherein said first control means has at least a first mode for executing successive operations for picking up images by emitting said strobo-light and a second mode for executing successive operations for picking up images without emitting of said strobo-light, and determines whether said first mode is to be executed or said second mode is to be executed according to a result of a comparison between an exposure time obtained based on a photometric value by said image pickup means and a preset allowable time in consideration of camera shaking.

17. An image input device for executing successive operations for picking up images comprising:

an image pickup device which picks up an image of an object to obtain image data for the object for a certain number of pixels;

a light-shuttering unit configured to perform a light-shuttering operation to form a light-shuttered state relative to said image pickup device;

a strobo light emitting unit which emits strobo-light when an image of an object is picked up by said image pickup device;

a first control unit which controls a second operation for picking up an image among successive operations for picking up images by said image pickup device at a timing when the image data obtained in a first operation for picking up an image among the successive operations for picking up images by said image pickup device is read out from said image pickup device, and also for controlling, after said second operation for picking up the image, the light-shuttering operation by said light-shuttering unit at a timing earlier than a timing when the image data obtained in said second operation for picking up the image is read out from said image pickup device; and a second control unit which controls an operation for emitting strobo-light by said strobo light emitting unit so that a time interval from starting of said second operation for picking up an image until second strobo-light is emitted is made shorter than a time interval from starting of said first operation for picking up an image until first strobo-light is emitted.

18. An image input device for executing successive operations for picking up images comprising:

an image pickup device which picks up an image of an object to obtain image data for a certain number of pixels;

a changing unit which changes a pickup range for the object to be photographed by said image pickup device;

a light-shuttering unit configured to perform a light-shuttering operation to form a light-shuttered state relative to said image pickup device;

a strobo-light emitting unit which emits strobo-light when an image of an object is picked up by said image pickup device;

a first control unit which controls an operation for changing said pickup range by said changing unit after a first operation for picking up an image among successive operations for picking up images by said image pickup device, controlling a second operation for picking up an image among the successive operations for picking up images by said image pickup device at a timing when the image data obtained in the first operation for picking up the image is read out from said image pickup device, and also controlling, after said second operation for picking up the image, the light-shuttering operation by said light-shuttering unit at a timing earlier than a timing when the image data obtained in said second operation for picking up the image is read out from said image pickup device; and a second control unit which controls a strobo-light emitting operation by said strobo-light emitting unit so that a time interval from starting of said second operation for picking up an image until a second strobo-light is emitted is made shorter than a time interval from starting of said first operation for picking up an image until a first strobo-light is emitted.

19. An image input device for executing successive operations for picking up images comprising:

an image pickup device which picks up an image of an object to obtain image data for a certain number of pixels;

a storing unit which stores therein image data read out from said image pickup device;

a light-shuttering unit configured to perform a light-shuttering operation to form a light-shuttered state relative to said image pickup device;

a strobo-light emitting unit which emits strobo-light when an image of an object is picked up by said image pickup device;

a first control unit which controls a second operation for picking up an image among successive operations for picking up images by said image pickup device at a timing when first image data obtained in a first operation for picking up an image among the successive operations for picking up images by said image pickup device is read out from said image pickup device, and also controlling, after said second operation for picking up the image, the light-shuttering operation by said light-shuttering unit at a timing earlier than a timing when second image data obtained in said second operation for picking up the image is read out from said image pickup device;

a second control unit which controls a strobo-light emitting operation by said strobo-light emitting unit so that a time interval from starting of said second operation for picking up an image until a second strobo-light is emitted is made shorter than a time interval from starting of said first operation for picking up an image until a first strobo-light is emitted; and an image synthesizing unit which synthesizes the first and second image data read out from said image pickup device and stored in said storing unit under control by said first control unit.

20. An image input device for executing successive operations for picking up images comprising:

an image pickup device which picks up an image of an object to obtain image data for a certain number of pixels;

a changing unit which changes a pickup range of an object to be photographed by said image pickup device;

a storing unit which stores therein image data read out from said image pickup device;

a light-shuttering unit configured to perform a light-shuttering operation to form a light-shuttered state relative to said image pickup device;

a strobo-light emitting unit which emits strobo-light when an image of an object is picked up by said image pickup device;

a first control unit which controls an operation for changing a pickup range by said changing unit after a first operation for picking up an image among successive operations for picking up images by said image pickup device, controlling a second operation for picking up an image among the successive operations for picking up images by said image pickup device at a timing when the first image data obtained in the first operation for picking up the image is read out from said image pickup device, and also controlling, after said second operation for picking up the image, the light-shuttering operation by said light-shuttering unit at a timing earlier than a timing when the second image data obtained in said second operation for picking up the image is read out from said image pickup device;

a second control unit which controls a strobo-light emitting operation by said strobo-light emitting unit so that a time interval from starting of said second operation for picking up an image until a second strobo-light is emitted is made shorter than a time interval from starting of said first operation for picking up an image until a first strobo-light is emitted; and an image synthesizing unit which synthesizes the first and second image data read out from said image picking device arid stored in said storing unit under control by said first control unit.

21. An image input method for executing successive operations for picking up images comprising the steps of:

picking up an image of an object to obtain image data for the object for a certain number of pixels;

performing a light-shuttering operation to form a light-shuttered state;

emitting strobo-light when an image of an object is picked up;

controlling a second operation for picking up an image among successive operations for picking up images at a timing when the image data obtained in a first operation for picking up an image among the successive operations for picking up images is read out, and also for controlling, after said second operation for picking up the image, the light-shuttering operation at a timing earlier than a timing when the image data obtained in said second operation for picking up the image is read out; and controlling an operation for emitting strobo-light so that a time interval from starting of said second operation for picking up an image until second strobo-light is emitted is made shorter than a time interval from starting of said first operation for picking up an image until first strobo-light is emitted.

22. An image input method for executing successive operations for picking up images composing the steps of:

picking up an image of an object to obtain image data for a certain number of pixels;

changing a pickup range for the object to be photographed;

performing a light-shuttering operation to form a light-shuttered state;

emitting strobo-light when an image of an object is picked up;

controlling an operation for changing said pickup range after a first operation for picking up an image among the successive operations for picking up images, controlling a second operation for picking up an image among the successive operations for picking up images at a timing when the image data obtained in the first operation for picking up the image is read out, and also controlling, after said second operation for picking up the image, the light-shuttering operation at a timing earlier than a timing when the image data obtained in said second operation for picking up the image is read out; and controlling a strobo-light emitting operation so that a time interval from starting of said second operation for picking up an image until a second strobo-light is emitted is made shorter than a time interval from starting of said first operation for picking up an image until a first strobo-light is emitted.

23. An image input method for executing successive operations for picking up images comprising the steps of:

picking up an image of an object to obtain image data for a certain number of pixels;

storing therein image data read out;

performing a light-shuttering operation to form a light-shuttered state;

emitting strobo-light when an image of an object is picked up;

controlling a second operation for picking up an image among successive operations for picking up images at a timing when first image data obtained in a first operation for picking up an image among the successive operations for picking up images is read out, and also controlling, after said second operation for picking up the image, the light-shuttering operation at a timing earlier than a timing when second image data obtained in said second operation for picking up the image is read out;

controlling a strobo-light emitting operation so that a time interval from starting of said second operation for picking up an image until a second strobo-light is emitted is made shorter than a time interval from starting of said first operation for picking up an image until a first strobo-light is emitted; and synthesizing the first and second image data read out and stored.

24. An image input method for executing successive operations for picking up images comprising the steps of:

picking up an image of an object to obtain image data for a certain number of pixels;

changing a pickup range of an object to be photographed;

storing therein image data read out;

performing a light-shuttering operation to form a light-shuttered state;

emitting strobo-light when an image of an object is picked up;

controlling an operation for changing a pickup range after a first operation for picking up an image among successive operations for picking up images, controlling a second operation for picking up an image among the successive operations for picking up images at a timing when the first image data obtained in the first operation for picking up the image is read out, and also controlling, after said second operation for picking up the image, the light-shuttering operation at a timing earlier than a timing when the second image data obtained in said second operation for picking up the image is read out;

controlling a strobo-light emitting operation so that a time interval from starting of said second operation for picking up an image until a second strobo-light is emitted is made shorter than a time interval from starting of said first operation for picking up an image until a first strobo-light is emitted; and synthesizing the first and second image data read out and stored.

* * * * *